UNITED STATES PATENT OFFICE.

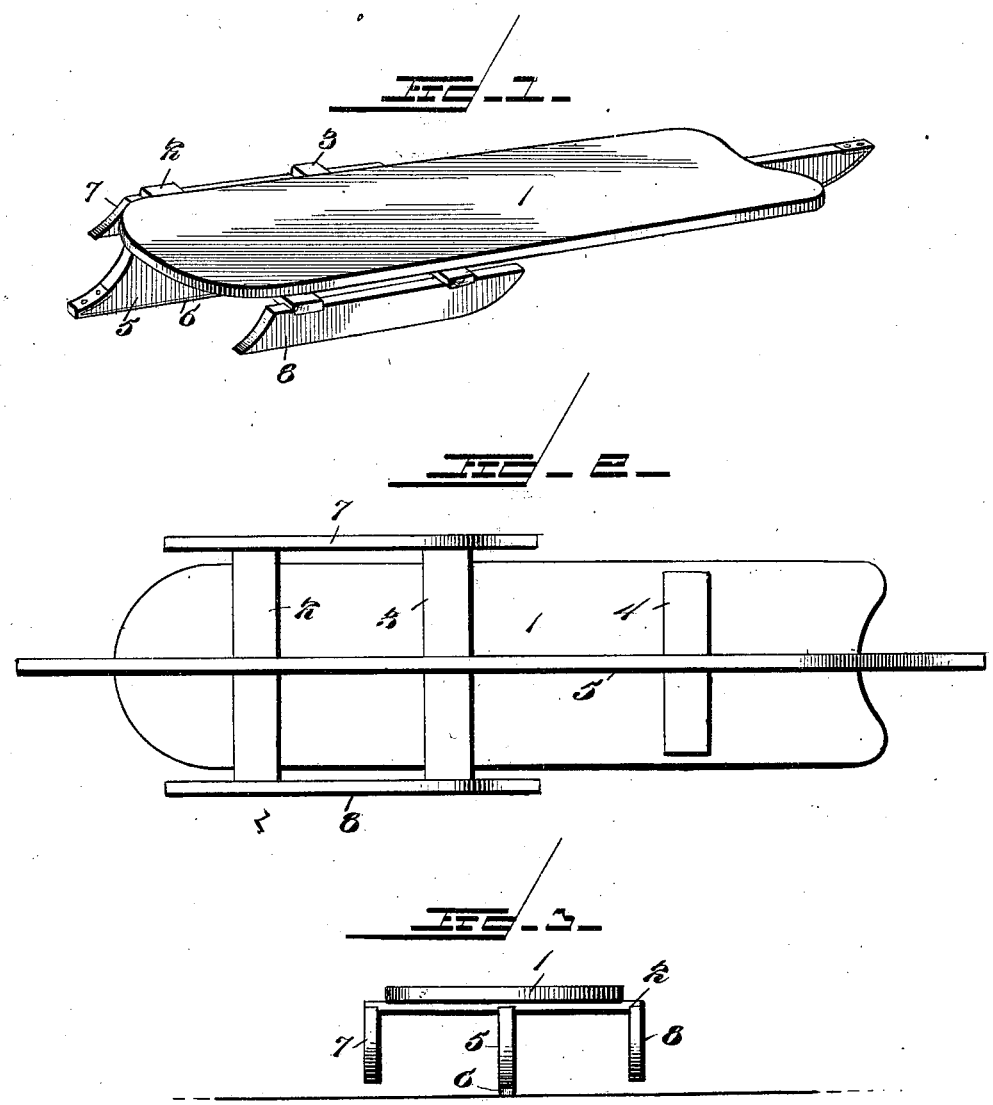

ROBERT E. HICKSON, OF MORO, OREGON.

SLED.

SPECIFICATION forming part of Letters Patent No. 664,215, dated December 18, 1900.

Application filed April 19, 1900. Serial No. 13,529. (No model.)

*To all whom it may concern:*

Be it known that I, ROBERT E. HICKSON, a citizen of the United States, residing at Moro, in the county of Sherman and State of Oregon, have invented a new and useful Sled, of which the following is a specification.

This invention relates to coasting-sleds; and the object of the same is to provide a simple device of this character upon which the rider or coaster can comfortably sit in an upright position and steer with the greatest accuracy and ease by a mere inclination of the body to the side he wishes to turn and wherein the turning movement is regulable to produce a sharp or wide turn and to dispense with the usual attachments for steering a sled and to have all the parts rigid and durable.

The invention consists in the construction and arrangement of the several parts, which will be more fully hereinafter described and claimed.

In the drawings, Figure 1 is a perspective view of a sled embodying the features of the invention. Fig. 2 is a bottom plan view of the improved sled. Fig. 3 is a rear end elevation of the same.

Similar numerals of reference are employed to indicate corresponding parts in the several views.

The numeral 1 designates a seat-board of elongated form having transverse cross supports or strips 2, 3, and 4 secured to the under side thereof, the supports or strips 2 and 3 being nearer the rear end and slightly projected beyond the side edges of the said seat-board. The cross-strip 4 is nearer the front end of the seat-board, and extending longitudinally under the center of the said board and secured firmly to the strips 2, 3, and 4 is a main runner 5, which is projected at the front and slightly at the rear and is shod with iron or steel, as at 6, for obvious reasons. This main runner 5 is continuous or unbroken from end to end and serves as the support for the sled during the coasting operation, and rigidly fixed to the outer extremities of the cross-strips 2 and 3 are auxiliary steering-runners 7 and 8, which are also immovable except bodily with the movements of the sled and of less width than the main center runner 5. As clearly shown by Fig. 2, the auxiliary runners are clear of the surface on which the runner 5 has movement, but are close enough to the surface to be quickly brought into use and facilitate guiding the sled in the direction desired by the rider or coaster.

In the use of the sled the rider or coaster sits thereon in an upright position and when starting either of the auxiliary runners can be brought down to the bearing-surface to aid the rider or coaster in properly disposing himself or to hold the sled previous to the start. While in coasting motion the sled is supported entirely by the main center runner 5; but when it is desired to steer the same either to the right or left the rider or coaster rocks his body laterally in the direction that the turn is to be made, and if to the right the runner 8 will be brought down to the bearing-surface and cause the sled to turn to the right. This right course may be quickly changed to bring up the sled in a straight line or to turn to the left by a movement of the rider or coaster to the left to clear the runner 8 and cause the runner 7 to contact with the bearing-surface. The steering of the sled under these conditions is very sensitive, and the degree of the arc described will depend exclusively upon a light or firm bearing of either of the runners 7 and 8 on the surface over which the main center runner 5 travels. The harder the rider or coaster throws his weight downwardly on the side and in the direction in which he desires to turn the quicker will be the response, and if a long or gradual turn is to be made the auxiliary runner brought into play will be caused to only slightly touch the bearing-surface. The parts of the sled are rigid throughout and simple in construction, and the usual custom of lying full length on the seat-board and steering with the toes is completely avoided and the wear and tear on shoes arising from such custom are overcome.

It is obviously apparent that the seat-board 1 may be varied in form and its dimensions changed, as well as the form and details of construction of the other parts, without departing from the principle of the invention.

Having thus described the invention, what is claimed as new is—

1. As a new article of manufacture, the herein-described sled having the following rigidly-connected relatively-immovable members, to wit: a single continuous longitudinal central runner, and side steering-runners of a less length than the central runner arranged upon opposite sides and adjacent to the rear end of the central runner, and of less depth than said runner, whereby the lower edges of said steering-runners are arranged in a plane beyond which the lower edge of the central runner projects, and whereby the lateral tilting of the sled on the lower edge of said central runner is necessary to bring the lower edge of either steering-runner into a common horizontal plane with the lower edge of the central runner, to cause a lateral and rearward drag on the central runner.

2. As a new article of manufacture, the herein-described sled consisting of the following rigidly-connected relatively-immovable elements, to wit: a seat-board, a longitudinal central runner, and steering-runners, shorter than the central runner, arranged upon opposite sides and adjacent to the rear end of the same, the lower edges of the steering-runners being spaced at a less distance from the plane of the seat-board than that of the central runner.

3. As a new article of manufacture, the herein-described sled comprising the following rigidly-connected relatively-immovable members, to wit: a central longitudinal runner, transverse strips supported centrally by said runner, side steering-runners supported by and secured to the extremities of said strips, at equal distances from and upon opposite sides of the plane of the central runner near its rear end, and having their lower edges arranged at a less distance from the plane of the strips than the lower edge of the central runner, and a seat-board supported by said strips.

In testimony that I claim the foregoing as my own I have hereto affixed my signature in the presence of two witnesses.

ROBERT E. HICKSON.

Witnesses:
E. R. AIDESON,
W. STANLEY.